(12) United States Patent
Yukimura et al.

(10) Patent No.: US 8,984,863 B2
(45) Date of Patent: Mar. 24, 2015

(54) AMMONIA INJECTION DEVICE

(75) Inventors: Akinori Yukimura, Tokyo (JP);
Masafumi Kawai, Tokyo (JP);
Yoshiyuki Yamane, Tokyo (JP)

(73) Assignee: IHI Corporation (JP)

( * ) Notice: Subject to any disclaimer, the term of this patent is extended or adjusted under 35 U.S.C. 154(b) by 50 days.

(21) Appl. No.: 13/881,226

(22) PCT Filed: Nov. 1, 2011

(86) PCT No.: PCT/JP2011/075189
§ 371 (c)(1),
(2), (4) Date: Apr. 24, 2013

(87) PCT Pub. No.: WO2012/060378
PCT Pub. Date: May 10, 2012

(65) Prior Publication Data
US 2013/0213511 A1    Aug. 22, 2013

(30) Foreign Application Priority Data
Nov. 2, 2010    (JP) .................................. 2010-246151

(51) Int. Cl.
*F01N 3/00* (2006.01)
*B01F 3/08* (2006.01)
(Continued)

(52) U.S. Cl.
CPC .......... *B01F 3/0865* (2013.01); *B01D 53/8631* (2013.01); *B01D 53/90* (2013.01);
(Continued)

(58) Field of Classification Search
USPC ............ 60/286, 295, 301, 303, 324; 422/168, 422/169, 170, 171, 172, 182, 183; 423/210, 423/235, 239.1, 243.01; 42/210, 235, 238, 42/239.1, 243.01
See application file for complete search history.

(56) References Cited

U.S. PATENT DOCUMENTS 4,131,432 A * 12/1978 Sato et al. ...................... 422/177
5,282,355 A *  2/1994 Yamaguchi .................... 60/39.5
(Continued)

FOREIGN PATENT DOCUMENTS

JP    58-137424    9/1983
JP    59-176635    11/1984
(Continued)

OTHER PUBLICATIONS

International Search Report and Written Opinion mailed Feb. 7, 2012 in corresponding PCT International Application No. PCT/JP2011/075189.
(Continued)

*Primary Examiner* — Binh Q Tran
(74) *Attorney, Agent, or Firm* — Ostrolenk Faber LLP

(57) ABSTRACT

Provided is an ammonia injection device (10) installed at an exhaust gas duct through which an exhaust gas generated in a gas turbine flows, and configured to inject ammonia into the exhaust gas at an upstream side of a denitration catalyst configured to perform denitration processing in a flowing direction of the exhaust gas, the device including a plurality of ammonia injection pipes (11) disposed in parallel each other in a surface which traverses the exhaust gas duct. A plurality of nozzle pipes (12) configured to eject the ammonia from the ammonia injection pipes in an arrangement direction of the plurality of ammonia injection pipes are installed at the ammonia injection pipe in a longitudinal direction of the ammonia injection pipes. Diffuser panels (13) extending toward a downstream side in a flowing direction of the exhaust gas at both sides in a longitudinal direction of the ammonia injection pipes with respect to the nozzle pipes are formed at the nozzle pipes. The ammonia injection device can contribute to a compact exhaust gas denitration system.

3 Claims, 4 Drawing Sheets

(51) Int. Cl.
*B01D 53/86* (2006.01)
*B01D 53/90* (2006.01)
*F01D 25/30* (2006.01)
*F23J 15/00* (2006.01)

(52) U.S. Cl.
CPC ............ *F01D 25/305* (2013.01); *F23J 15/003* (2013.01); *B01D 2251/2062* (2013.01); *F05D 2270/082* (2013.01); *F23J 2215/10* (2013.01)
USPC ............... 60/286; 60/295; 60/301; 60/303; 60/324; 422/169; 422/170; 422/182; 422/183; 423/210; 423/238; 423/239.1

(56) References Cited

U.S. PATENT DOCUMENTS

| | | | | |
|---|---|---|---|---|
| 6,449,947 | B1 * | 9/2002 | Liu et al. | 60/286 |
| 6,887,435 | B1 * | 5/2005 | Albrecht et al. | 422/172 |
| 7,814,745 | B2 * | 10/2010 | Levin et al. | 60/286 |
| 8,033,714 | B2 * | 10/2011 | Nishioka et al. | 366/163.2 |

FOREIGN PATENT DOCUMENTS

| | | |
|---|---|---|
| JP | 61-254230 | 11/1986 |
| JP | 4-065118 | 6/1992 |
| JP | 7-009428 | 2/1995 |
| JP | 9-173785 | 7/1997 |
| JP | 10-057768 | 3/1998 |
| JP | 2000-279765 | 10/2000 |
| JP | 2010-042356 | 2/2010 |
| JP | 2010-221084 | 10/2010 |

OTHER PUBLICATIONS

Notice of Allowance dated Jul. 8, 2014 issued in corresponding Japanese Patent Application 2012-541877 with English translation.

* cited by examiner

AMMONIA INJECTION DEVICE

CROSS-REFERENCE TO RELATED APPLICATIONS

The present application is a 35 U.S.C. §§371 national phase conversion of PCT/JP2011/075189, filed Nov. 1, 2011, which claims priority to Japanese Patent Application No. 2010-246151, filed Nov. 2, 2010, the contents of which are incorporated herein by reference. The PCT International Application was published in the Japanese language.

TECHNICAL FIELD

The present invention relates to an ammonia injection device used in an exhaust gas denitration system configured to remove nitrogen oxide ($NO_x$) included in an exhaust gas generated in a combustor such as a gas turbine, a boiler, or the like.

In the above-mentioned exhaust gas denitration system, the ammonia injection device is disposed in an exhaust gas duct leading to a combustor such as a gas turbine, a boiler, or the like, and a denitration catalyst is disposed at a downstream side of the ammonia injection device disposed in the exhaust gas duct.

The ammonia injection device includes a plurality of ammonia injection pipes disposed in parallel to each so as to traverse the exhaust gas duct, and a number of injection holes are formed in the ammonia injection pipes.

In the exhaust gas denitration system, ammonia is injected with respect to an exhaust gas from the plurality of ammonia injection pipes of the ammonia injection device toward the denitration catalyst, the exhaust gas containing the ammonia is reacted with the denitration catalyst, and thus, nitrogen oxide is decomposed into nitrogen and water to become pollution-free.

In this case, uniform injection of the ammonia into the exhaust gas is attempted by increasing a distance from the ammonia injection device to the denitration catalyst to secure a residence time for sufficiently diffusing the ammonia in the exhaust gas, disposing the plurality of ammonia injection pipes and the number of injection holes at a high density, or disposing a mixing apparatus between the ammonia injection device and the denitration catalyst.

In recent times, in a gas turbine combined cycle or the like, as the exhaust heat recovery boiler becomes compact, a distance between the ammonia injection device and the denitration catalyst, which are accommodated in the exhaust heat recovery boiler, tends to be reduced. As the distance from the ammonia injection device to the denitration catalyst is reduced, mixing of the ammonia injected from the ammonia injection device with the exhaust gas becomes insufficient, and thus, a denitration function of the denitration catalyst may not be sufficiently exhibited.

In the related art, an ammonia injection device in which a pair of first radial flat plate blades having a positive angle of incidence with respect to a flowing direction of the exhaust gas and a pair of second radial flat plate blades having a negative angle of incidence with respect to the flowing direction of the exhaust gas are alternately installed at the plurality of ammonia injection pipes in a longitudinal direction by a number of pairs has been proposed (for example, see Patent Document 1).

In the ammonia injection device, a vortex is generated at a downstream side of the ammonia injection pipe by the first radial flat plate blades and the second radial flat plate blades installed by a number of pairs. Then, as the ammonia is injected into a flow of the exhaust gas having such a vortex from the injection holes, uniform mixing of the ammonia into the exhaust gas is accomplished at a short distance to the denitration catalyst.

RELATED ART DOCUMENT

Patent Document

[Patent Document 1] Japanese Patent Application, First Publication No. 2000-279765

SUMMARY OF THE INVENTION

Problems to be Solved by the Invention

In the above-mentioned conventional ammonia injection device, uniform mixing of the ammonia into the exhaust gas can be accomplished at a relatively short distance. However, in order to realize a further compact exhaust gas denitration system, it is necessary that uniform mixing of the exhaust gas and the ammonia is performed at a shorter distance. That is, development of an ammonia injection device having better mixing performance is needed.

In consideration of the above-mentioned requirements and in comparison with the conventional art, it is an object of the present invention to provide an ammonia injection device capable of performing uniform mixing of an exhaust gas and ammonia at a shorter distance and thus attributing to a compact exhaust gas denitration system.

Means for Solving the Problems

The present invention relates to an ammonia injection device disposed at an exhaust gas duct through which an exhaust gas generated in a combustor flows, and configured to inject ammonia into the exhaust gas at an upstream side of a denitration catalyst configured to perform denitration processing in a flowing direction of the exhaust gas. The ammonia injection device according to the present invention includes a plurality of ammonia injection pipes disposed in parallel each other in a surface which traverses the exhaust gas duct. A plurality of nozzle pipes configured to eject the ammonia from the ammonia injection pipes in an arrangement direction of the plurality of ammonia injection pipes are installed at the ammonia injection pipe in a longitudinal direction of the ammonia injection pipes. In addition, diffuser panels extending toward a downstream side in a flowing direction of the exhaust gas at both sides in a longitudinal direction of the ammonia injection pipes with respect to the nozzle pipes are formed at the nozzle pipes.

Further, in the following description, the "upstream side" and the "downstream side" represent an upstream side and a downstream side in the above-mentioned flowing direction of the exhaust gas, unless the context clearly indicates otherwise.

In addition, in the ammonia injection device according to the present invention, the diffuser panel may be supported by the nozzle pipe at the upstream side. For example, the diffuser panel may have a rectangular flat plate shape, a center of which is bent, and the bent portion of the center may be fixed to the nozzle pipe from the upstream side.

In the exhaust gas denitration system in which the ammonia injection device according to the present invention is used, for example, the ammonia injection device is disposed in the exhaust gas duct from the combustor, and the denitration catalyst is disposed at a downstream side of the ammonia injection device in the exhaust gas duct.

When an exhaust heat recovery boiler is designed in consideration of a sufficient installation space, the ammonia injection device may be disposed at an upstream side of a high pressure evaporator, and the denitration catalyst may be disposed at a downstream side of the high pressure evaporator in many cases. In this case, the ammonia injected into the exhaust gas from the ammonia injection device is sufficiently mixed with the exhaust gas by a heat transfer pipe of the high pressure evaporator until arriving at the denitration catalyst.

Additionally, when the exhaust heat recovery boiler is intended to be compact and the ammonia injection device and the denitration catalyst are installed in a limited space, i.e., when they are used in the exhaust gas denitration system required to be compact, the ammonia injection device is disposed very close to the upstream side of the denitration catalyst. In addition, carbonyl chloride (COC) (carbon monoxide (CO) oxidation catalyst) may be disposed between the upstream side high pressure evaporator and the ammonia injection device. Even in this case, the distance between the ammonia injection device and the denitration catalyst is reduced.

In the ammonia injection device according to the present invention, when the exhaust gas generated in the combustor passes through the plurality of ammonia injection pipes of the ammonia injection device installed to traverse the exhaust gas duct, a vortex is generated at the downstream side of the ammonia injection pipe by the plurality of diffuser panels disposed at the ammonia injection pipe.

Here, the diffuser panels are disposed via the plurality of nozzle pipes installed in the longitudinal direction of the ammonia injection pipe, and the diffuser panel itself has a rectangular flat plate shape, the center of which is bent. Furthermore, both sides of the bent center extend toward the downstream side from both sides in the longitudinal direction of the ammonia injection pipe centered on the nozzle pipe. As a result, a Karman vortex is generated at the downstream side of the ammonia injection pipe. Then, when the ammonia is injected from the nozzle pipe into a flow of the exhaust gas having such a Karman vortex, uniform mixing of the ammonia with the exhaust gas can be accomplished at a short distance to the denitration catalyst.

In addition, when the diffuser panel extending from both sides in the longitudinal direction of the ammonia injection pipe centered on the nozzle pipe has a rectangular flat plate shape, a center of which is bent, and the center bent portion of the diffuser panel is fixed to the upstream side of the nozzle pipe, labor consumed for manufacturing the device can be reduced.

Effect of the Invention

In the ammonia injection device according to the present invention, according to the above-mentioned configuration, the exhaust gas and the ammonia can be uniformly mixed in a more limited space. Therefore, the ammonia injection device can be disposed in the vicinity of the denitration catalyst, and as a result, a very superior effect, so called contribution to a compact exhaust gas denitration system, can be obtained.

MODES FOR CARRYING OUT THE INVENTION

Hereinafter, embodiments of the present invention will be described based on the accompanying drawings.

FIG. 1 and FIG. 2A to FIG. 2D show an ammonia injection device according to an embodiment of the present invention. In the embodiment, the case in which the ammonia injection device of the present invention is applied to a gas turbine combined cycle is shown.

Figure 1:
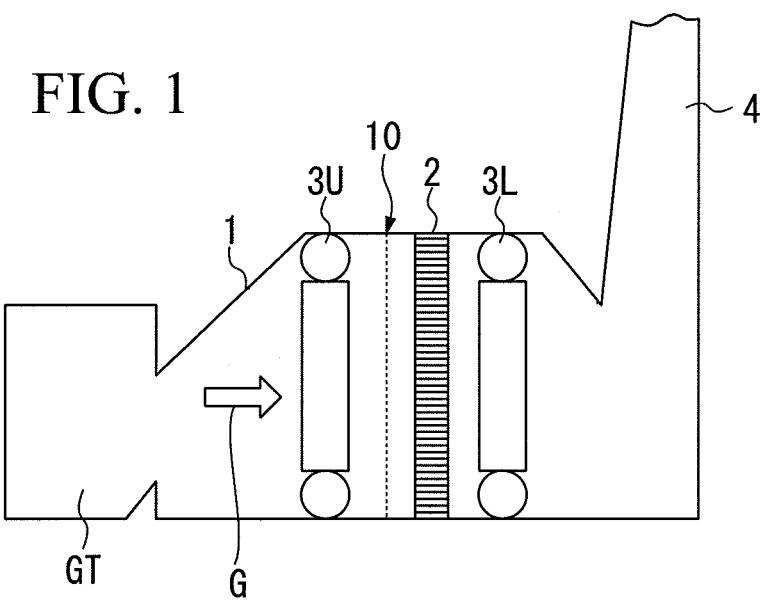
FIG. 1 is a view showing a schematic configuration of an ammonia injection device according to an embodiment of the present invention, which is applied to a gas turbine combined cycle.

As shown in FIG. 1, an ammonia injection device 10 is used in a denitration system configured to remove nitrogen oxide ($NO_x$) contained in an exhaust gas G generated in a gas turbine GT (a combustor). In the exhaust gas denitration system, the ammonia injection device 10 is disposed in an exhaust gas duct 1 leading from the gas turbine GT to a chimney 4, and a denitration catalyst 2 is disposed at a downstream side of the ammonia injection device 10. Then, a high pressure evaporator 3U is disposed at an upstream side and a low pressure evaporator 3L is disposed at a downstream side to sandwich the exhaust gas denitration system therebetween.

Figure 2A:
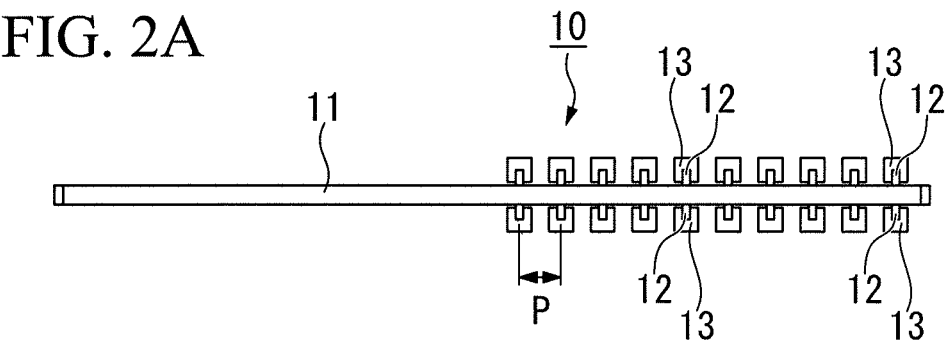
FIG. 2A is a view for describing the entire structure of the ammonia injection device when an ammonia injection pipe constituting the ammonia injection device of FIG. 1 is seen from a downstream side.
Figure 2B:
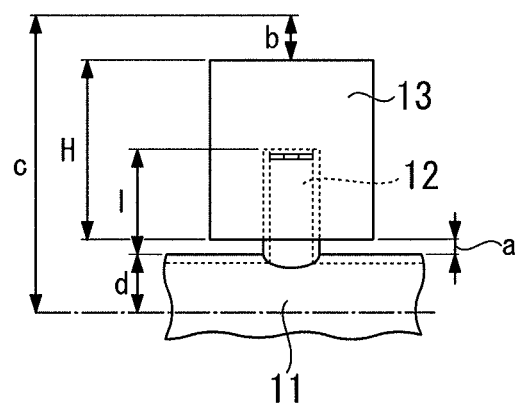
FIG. 2B is an enlarged view in which a nozzle pipe and a diffuser panel installed at the ammonia injection pipe of the ammonia injection device of FIG. 1 is seen from a upstream side.

The ammonia injection device 10 includes a plurality of ammonia injection pipes 11 disposed in parallel each other in a surface which traverses the exhaust gas duct 1 in an upward/downward direction. In this case, as shown in FIGS. 2A and 2B, the individual ammonia injection pipes 11 extend in a horizontal direction, and upward and downward nozzle pipes 12 configured to eject ammonia supplied through the ammonia injection pipes 11 in the upward/downward direction are disposed at the ammonia injection pipes 11 at a plurality of places in a longitudinal direction of the ammonia injection pipes 11. In addition, when the ammonia injection pipes 11 are disposed in parallel each other in a leftward/rightward direction in a surface which traverses the exhaust gas duct 1, each of the ammonia injection pipes 11 extends in the upward/downward direction, the nozzle pipes 12 disposed at the ammonia injection pipe 11 are constituted by leftward and rightward nozzle pipes 12 configured to eject the supplied ammonia in leftward/rightward directions, respectively.

Figure 2C:
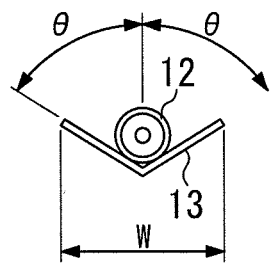
FIG. 2C is a plan view showing a structure of the diffuser panel of the ammonia injection device of FIG. 1.
Figure 2D:
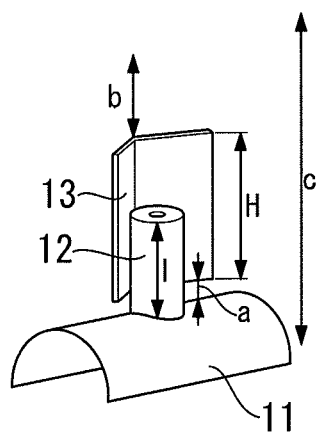
FIG. 2D is an enlarged perspective view showing major parts of the ammonia injection device of FIG. 1.

As shown in FIGS. 2B and 2C, diffuser panels 13 are installed at the nozzle pipe 12 and extend toward a downstream side (an upper side of FIG. 2C) at both sides (left and right sides of the drawing) in a longitudinal direction of the ammonia injection pipe 11 with respect to the nozzle pipe 12. In this case, the diffuser panel 13 has a shape in which a center of a rectangular flat plate is bent, and a bent portion of the center is fixed to a side surface of the nozzle pipe 12 from the upstream side.

In the exhaust gas denitration system, the ammonia is injected with respect to the exhaust gas G from the ammonia injection device 10 toward the denitration catalyst 2, the exhaust gas G containing the ammonia is reacted with the denitration catalyst 2, and thus, nitrogen oxide is decomposed into nitrogen and water, becoming pollution free.

In the above-mentioned ammonia injection device 10, when the exhaust gas G generated in the gas turbine GT passes through the plurality of ammonia injection pipes 11 installed to traverse the exhaust gas duct 1, a vortex is generated at a downstream side of the ammonia injection pipe 11 by the plurality of diffuser panels 13 disposed at the ammonia injection pipe 11.

Here, the diffuser panels 13 are disposed via the plurality of nozzle pipes 12 installed in a longitudinal direction of the ammonia injection pipe 11. In addition, the diffuser panel 13 itself has a rectangular flat plate shape, a center of which is bent, and both side sections of the bent center extends toward a downstream side at both sides in a longitudinal direction of the ammonia injection pipe 11 centered on the nozzle pipe 12. As a result, a Karman vortex is generated at the downstream side of the ammonia injection pipe 11. Then, as the ammonia is injected from the nozzle pipe 12 into a flow of the exhaust gas G having such a Karman vortex, uniform mixing of the ammonia into the exhaust gas G is accomplished at a short distance to the denitration catalyst 2.

In addition, in the ammonia injection device 10 according to the embodiment, the diffuser panel 13 extending to both sides in the longitudinal direction of the ammonia injection pipe 11 centered on the nozzle pipe 12 is formed by fixing the rectangular flat plate, a center of which is bent, to the upstream side of the nozzle pipe 12. For this reason, labor consumed for manufacturing the ammonia injection device 10 having the structure shown in FIGS. 2A to 2D can be reduced.

Further, as the diffuser panel 13 is installed at the upstream side of the nozzle pipe 12, an effect of forcedly mixing the ammonia ejected from the nozzle pipe 12 with the exhaust gas by the Karman vortex generated at the downstream side (a rear side) of the diffuser panel 13 is obtained. On the other hand, when the diffuser panel 13 is not installed at the upstream side of the nozzle pipe 12, since the ammonia ejected from the nozzle pipe 12 is diffused into the exhaust gas by a spray action of the ejected ammonia itself, without receiving an action by the forced mixing by the Karman vortex at the downstream side of the diffuser panel 13, it is considered that a mixing effect is relatively decreased.

In addition, in the ammonia injection device 10 having the structure shown in FIGS. 2A to 2D, a ratio of a pitch P of the plurality of nozzle pipes 12 and a width W of the diffuser panel 13 with respect to a gas flow may be within a range of 0.5 to 1.5. When the ratio is less than 0.5, the forced mixing effect by the Karman vortex by the diffuser panel 13 may be decreased, and diffusibility of the ammonia may be decreased. Further, when the ratio exceeds 1.5, an exhaust gas inflow amount from both sides of the diffuser panel 13 may be decreased, the forced mixing effect by the Karman vortex may be decreased, and diffusibility of the ammonia may be decreased.

In addition, a ratio of a length 1 of the nozzle pipe 12 and a height H of the diffuser panel 13 may be within a range of 0.25 to 0.75. When the ratio is smaller than 0.25 or larger than 0.75, since a position of an ejection nozzle of the nozzle pipe 12 is slightly deviated from a center of the diffuser panel 13, the forced mixing effect by the Karman vortex may be decreased, and diffusibility of the ammonia may be decreased.

Further, an aperture angle θ of one side of the diffuser panel 13 bent at a center thereof may be 30° to 90°. When the angle θ is less than 30° or larger than 90°, the forced mixing effect by the Karman vortex may be decreased, and diffusibility of the ammonia may be decreased.

Example 1

The ammonia injection device 10 of the example 1 having a structure shown in FIGS. 2A to 2D, in which the pitch P of the plurality of nozzle pipes 12 is set to 200 mm, the aperture angle θ of one side of the center-bent diffuser panel 13 is set to 60°, the width W of the diffuser panel 13 with respect to the gas flow is set to 100 mm, the height H of the diffuser panel 13 is set to 100 mm, the length 1 of the nozzle pipe 12 is set to about 55 mm, a radius d of the ammonia injection pipe 11 is set to about 45 mm, a clearance a of the ammonia injection pipe 11 and the diffuser panel 13 is set to about 8.5 mm, a clearance b with the upper side diffuser panel is set to about 50 mm, and a distance c from a center of the ammonia injection pipe 11 to the upper side diffuser panel is set to about 205 mm, was manufactured.

Example 2

In addition, the ammonia injection device 10 of the example 2, in which a clearance a of the ammonia injection pipe 11 and the diffuser panel 13 is set to about 14 mm, a distance c from the center of the ammonia injection pipe 11 to the upper side the diffusion panel is set to about 210 mm, and the other dimensions are set to the same as those of the example 1, was manufactured.

Example 3

Further, the ammonia injection device 10 of the example 3, in which the pitch P of the plurality of nozzle pipes 12 is set to 300 mm, the width W of the diffuser panel 13 with respect to the gas flow is set to 150 mm, the height H of the diffuser panel 13 is set to about 150 mm, the length 1 of the nozzle pipe 12 is set to about 140 mm, the clearance a of the ammonia injection pipe 11 and the diffuser panel 13 is set to about 35 mm, the clearance b with the upper side diffuser panel is set to about 75 mm, the distance c from a center of the ammonia injection pipe 11 to the upper side diffuser panel is set to about 305 mm, and the other dimensions are set to the same as those of the example 1, was manufactured.

Example 4

Furthermore, the ammonia injection device 10 of the example 4, in which the length 1 of the nozzle pipe 12 is set to about 110 mm, and the other dimensions are set to the same as those of the example 3, was manufactured.

Figure 3A:
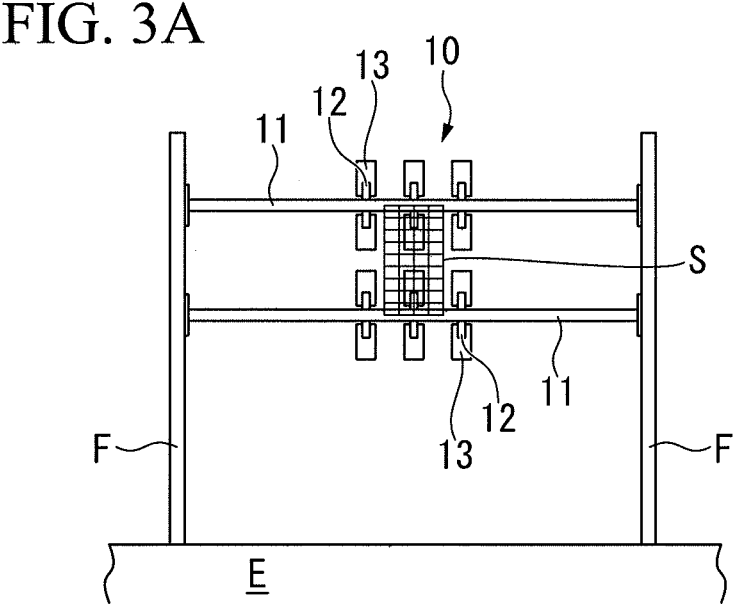
FIG. 3A is a front view for describing a structure of a test model used in a performance test of the ammonia injection device according to the respective examples of the present invention.
Figure 3B:
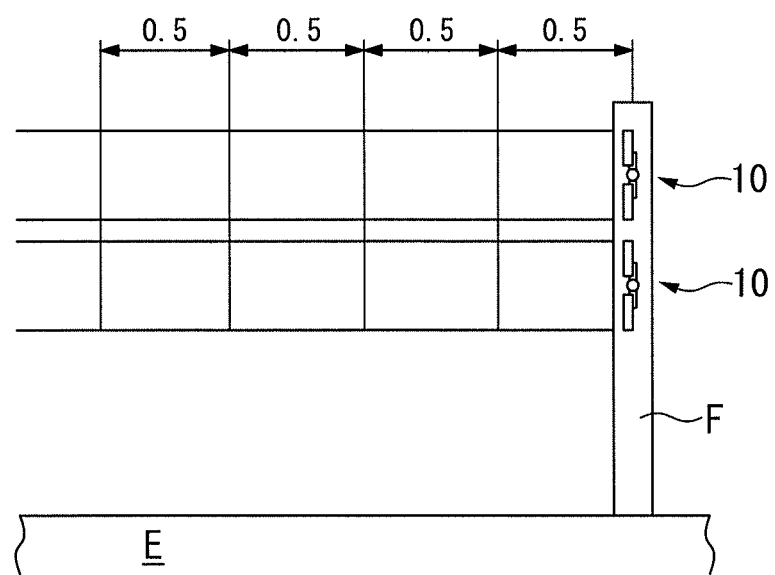
FIG. 3B is a side view for describing the structure of the test model used in the performance test of the ammonia injection device according to the respective examples of the present invention.

In order to confirm ammonia mixing performance of the ammonia injection device 10 of the above-mentioned examples 1 to 4, as shown in FIGS. 3A and 3B, the ammonia injection pipes 11 of the ammonia injection device 10 of the examples 1 to 4 were vertically and parallelly installed between frames F and F stood on a base E, measurement cross-sections were separated from the ammonia injection device 10 between the frames F and F by 0.5 m, and concentration measurement of an atomizing medium (pseudo ammonia) was performed at a position spaced a maximum of 2.0 m therefrom. The measurement cross-section is a measurement grid S having 5×9 points set between the ammonia injection pipes 11 and 11.

Figure 4:
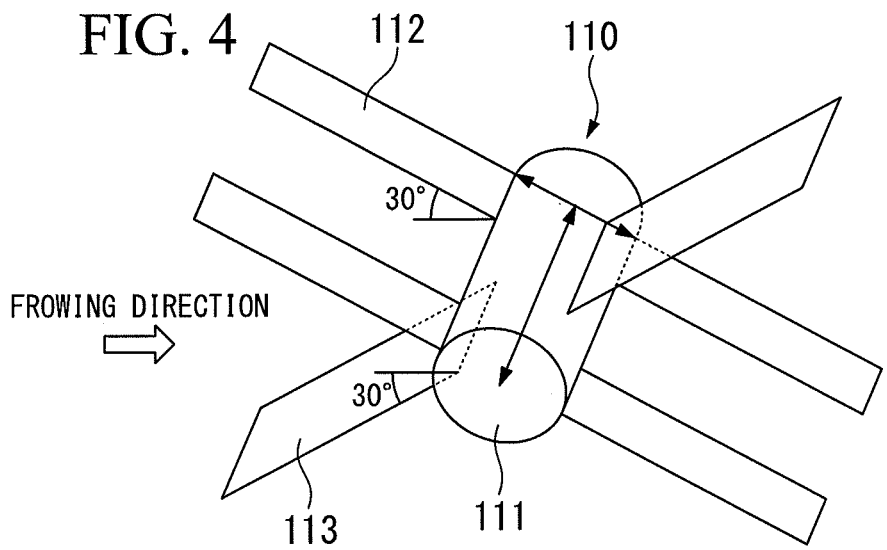
FIG. 4 is a perspective view for describing a structure of an ammonia injection pipe constituting an ammonia injection device, which is a comparative example.

On this occasion, as shown in FIG. 4, as a comparative example, the same test was also performed with respect to the conventional ammonia injection device, i.e., an ammonia injection device 110 in which a pair of first radial flat plate blades 112 having a positive angle of incidence with respect to a flowing direction of an exhaust gas and a pair of second radial flat plate blades 113 having a negative angle of incidence with respect to the flowing direction of the exhaust gas are alternately formed at the ammonia injection pipe 111 in a longitudinal direction by a plurality of pairs.

Figure 5:
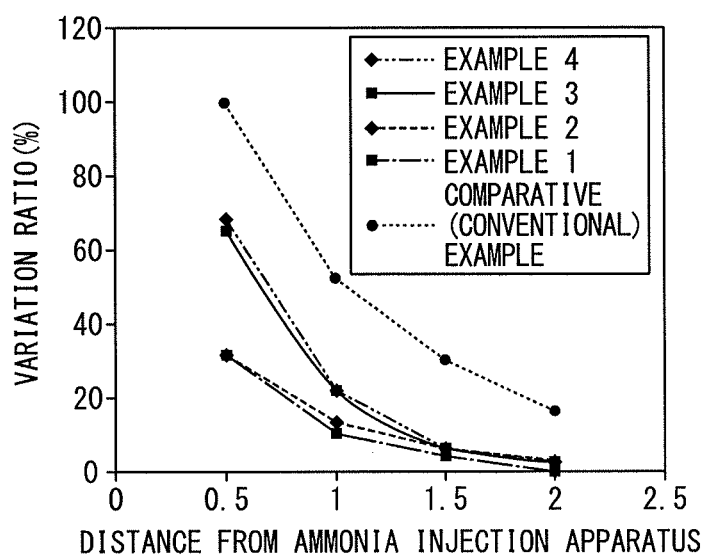
FIG. 5 is a graph showing a performance test result of the ammonia injection devices according to the respective examples of the present invention and the comparative example.

FIG. 5 shows the test result. In addition, in a graph of FIG. 5, variation ratio (%) of a vertical axis is a value acquired by dividing standard deviation of a cross-section concentration by a cross-section average concentration.

As shown in FIG. 5, in the ammonia injection device 110 of the comparative example, while the variation ratio of the atomizing medium concentration distribution arrives about 20% or less finally at a position spaced 2.0 m from the ammonia injection device 110, in the ammonia injection device 10 according to the examples 1 to 4, the variation ratio already arrives at 10% at a position spaced 1.5 m from the ammonia injection device 10. Accordingly, it will be appreciated that the ammonia injection device 10 according to the examples 1 to 4 has good mixing performance in comparison with the ammonia injection device 110 of the comparative example.

In addition, in ammonia injection device 10 according to the examples 3 and 4, in comparison with the ammonia injection device 10 according to the examples 1 and 2, while the variation ratio near at hand the ammonia injection device 10 is inferior, the number of parts can be reduced by an amount of capable of increasing the pitch P of the nozzle pipe 12.

Further, the configuration and installation location of the ammonia injection device according to the present invention are not limited to the above-mentioned embodiments and examples.

INDUSTRIAL APPLICABILITY

The ammonia injection device can contribute to a compact exhaust gas denitration system.

DESCRIPTION OF REFERENCE NUMERALS 1 exhaust gas duct, 2 denitration catalyst, 10 ammonia injection device, 11 ammonia injection pipe, 12 nozzle pipe, 13 diffuser panel, G exhaust gas

The invention claimed is:

1. An ammonia injection device installed at an exhaust gas duct through which an exhaust gas generated in a combustor flows, and configured to inject ammonia into the exhaust gas at an upstream side of a denitration catalyst configured to perform denitration processing in a flowing direction of the exhaust gas, the ammonia injection device comprising:
a plurality of ammonia injection pipes disposed in parallel with each other in a surface which traverses the exhaust gas duct,
wherein a plurality of nozzle pipes configured to eject the ammonia from the ammonia injection pipes in an arrangement direction of the plurality of ammonia injection pipes are installed at the ammonia injection pipes in a longitudinal direction of the ammonia injection pipes, and
a respective diffuser panel is formed at each nozzle pipe of the plurality of nozzle pipes, each of the panels extending toward a downstream side in a flowing direction of the exhaust gas and also extending toward both sides in a longitudinal direction of the ammonia injection pipes centered on the corresponding nozzle pipe.

2. The ammonia injection device according to claim 1, wherein the diffuser panel is supported by the nozzle pipe at the upstream side.

3. The ammonia injection device according to claim 2, wherein the diffuser panel has a rectangular flat plate shape, a center of which is bent, and the bent portion of the center is fixed to the nozzle pipe from the upstream side.

* * * * *